United States Patent [19]

Chen

[11] Patent Number: 5,070,616

[45] Date of Patent: Dec. 10, 1991

[54] HYDRAULIC TYPE PIPE CUTTER

[76] Inventor: Chin L. Chen, No. 9, Feng Sir Rd., Ta Sir Village, Seng Kang Hsiang, Taichung Hsien, Taiwan

[21] Appl. No.: 689,316

[22] Filed: Apr. 22, 1991

[51] Int. Cl.[5] ............ B23D 21/06

[52] U.S. Cl. ............ 30/92; 30/180; 30/182

[58] Field of Search ............ 30/92, 92.5, 175, 180, 30/182, 361, 362, 228, 241; 83/639.1, 639.2, 639.5, 639.7

[56] References Cited

U.S. PATENT DOCUMENTS

| | | | |
|---|---|---|---|
| 2,536,709 | 1/1951 | Ashton et al. | 83/639.1 |
| 2,714,250 | 8/1955 | Twedt | 30/182 |
| 2,722,740 | 11/1955 | Hubbard | 30/182 |
| 2,863,214 | 12/1958 | Szappanyos | 30/92 |
| 3,255,525 | 6/1966 | Frenzel | 30/228 |
| 3,469,481 | 9/1969 | Cloup | 83/639.1 |
| 3,922,782 | 12/1975 | Lind | 30/228 |
| 4,198,748 | 4/1980 | Lewis | 30/241 |
| 4,208,792 | 6/1980 | Swig, Jr. | 30/241 |
| 4,359,821 | 11/1982 | Pellenc | 30/228 |
| 4,949,461 | 8/1990 | van der Merwe et al. | 30/228 |

*Primary Examiner*—Mark Rosenbaum
*Assistant Examiner*—Hwei-Siu Payer
*Attorney, Agent, or Firm*—Merchant, Gould, Smith, Edell, Welter & Schmidt

[57] ABSTRACT

A pipe cutter includes a mouth formed in the front portion of a body for receiving a pipe to be cut, a handle pivotally coupled to the body and located in front of a grip, an upper cylinder and a lower cylinder coupled together, a container disposed in the body, and a cutter fixed to the piston rod of the upper cylinder. The container is connected between the cylinders. The hydraulic oil contained in the lower cylinder can be caused to flow into the upper cylinder when the handle is repeatedly pulled so that cutter can be caused to move forward in order to cut the pipe.

7 Claims, 3 Drawing Sheets

HYDRAULIC TYPE PIPE CUTTER

BACKGROUND OF THE INVENTION

1. Field the Invention

The present invention relates to a pipe cutter, and more particularly to a hydraulic type pipe cutter.

2. Description of the prior art

Typical pipe cutters are mechanical type mechanism which can not cut plastic pipe effectively.

SUMMARY OF THE INVENTION

The primary objective of the present invention is to provide a hydraulic type pipe cutter which can cut a plastic pipe neatly and effectively.

In accordance with one aspect of the invention, there is provided a pipe cutter which includes a grip extended downward from a body, a mouth formed in the front portion of the body for receiving a pipe to be cut, and a handle pivotally coupled to the body and located in front of the grip; a first cylinder disposed in the rear portion of the body and including a piston and a piston rod slidably disposed therein, the front end of the piston rod extending forward beyond the cylinder, a spring is biased between the cylinder and the piston; a cutter fixed to the front end of the first piston rod; a container disposed in the body for containing hydraulic oil and connected between the two cylinders; and a second cylinder disposed in an upper portion of the grip and including a piston and a piston rod which can be caused to move rearward by the handle. The two cylinders are connected together, and the first cylinder is communicated to the container. The cutter can be caused to move forward when the handle is repeatedly pulled so that the pipe can be cut by the cutter neatly.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
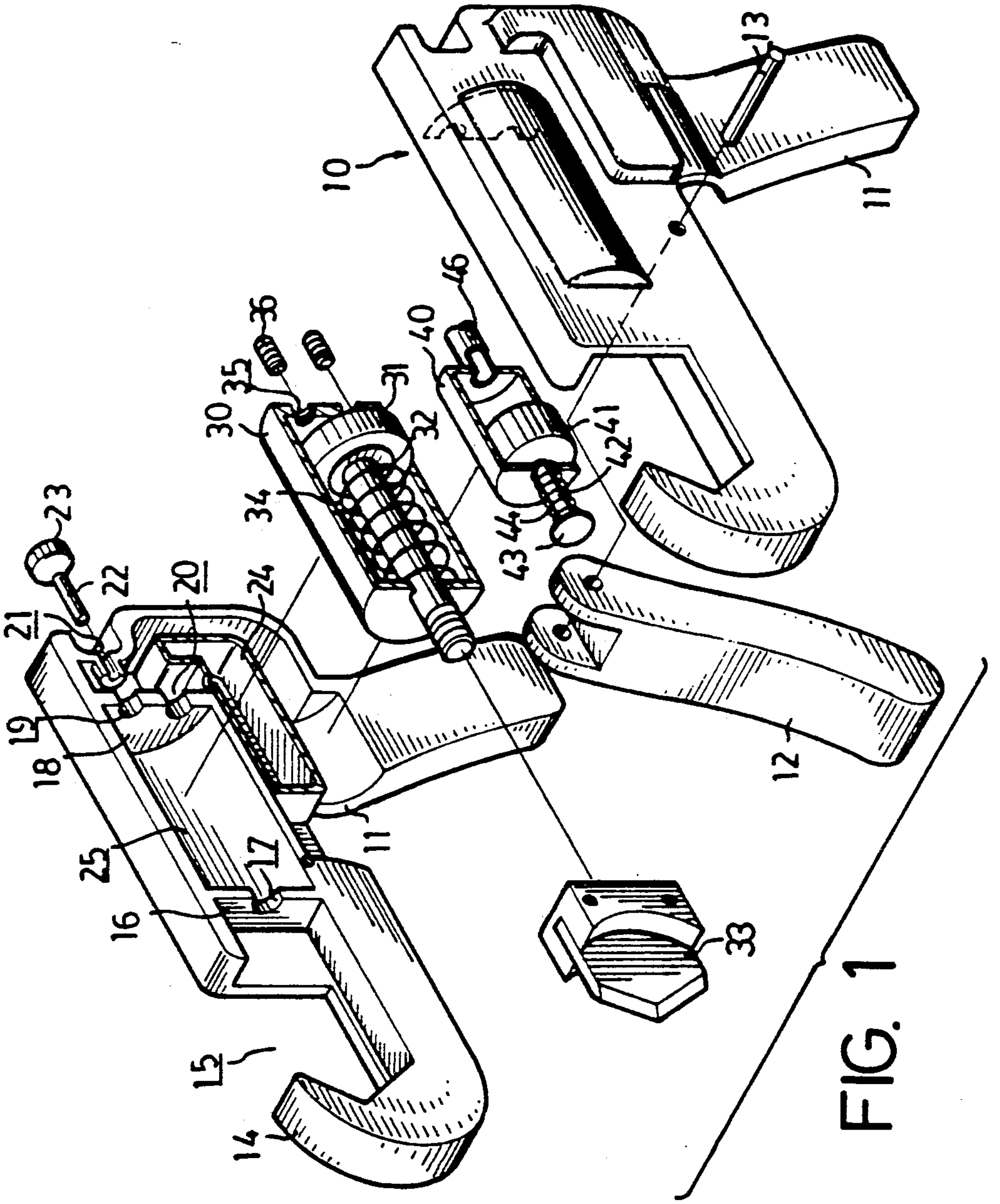
FIG. 1 is an exploded view of a hydraulic type pipe cutter in accordance with the present invention.
Figure 2:
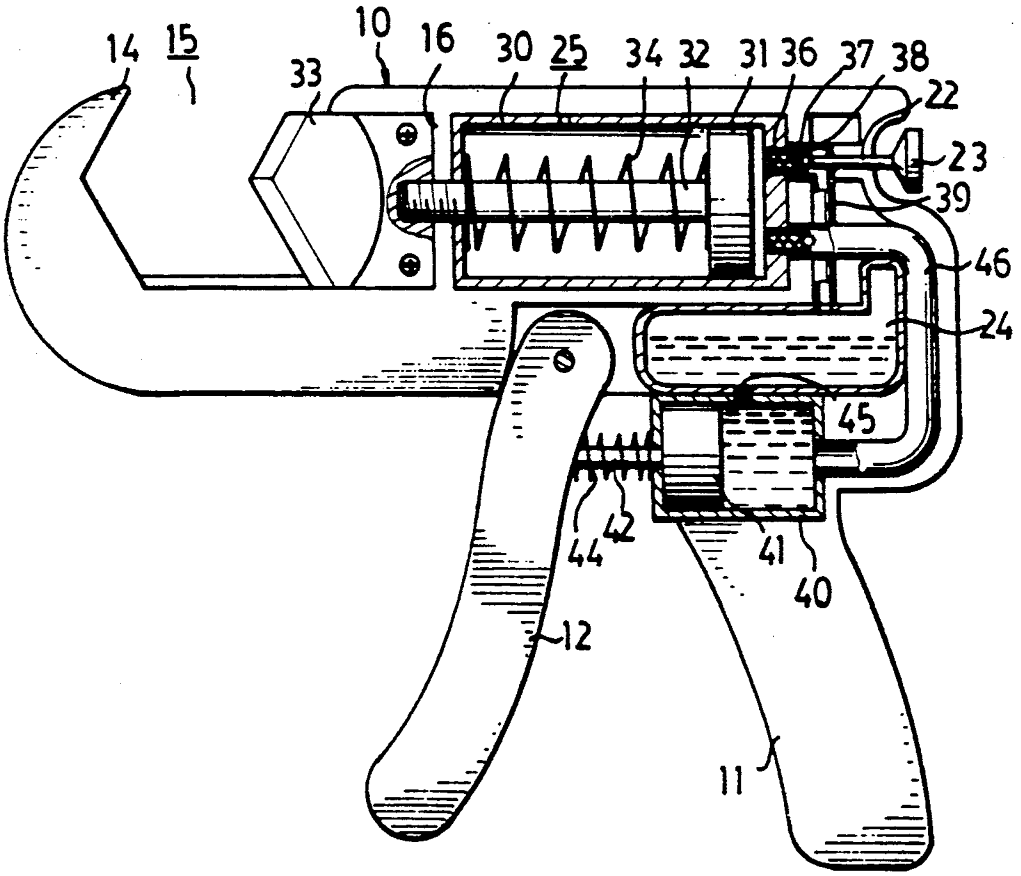
FIG. 2 is a partial cross sectional view of the hydraulic type pipe cutter.

Referring to the drawings and initially to FIGS. 1 and 2, the hydraulic type pipe cutter in accordance with the present invention comprises generally a two part body 10 having a grip member 11 extended downward therefrom so that the body 10 forms a gun shape. A handle 12 is pivotally coupled to the middle and lower portion of the body 10 by a shaft 13 and is provided in front of the grip member 11. A fixed jaw 14 is provided on the front end of the body 10. A mouth 15 is formed beside the fixed jaw 14 for receiving the plastic pipe 90 (FIG. 3) to be cut.

A pair of partition plates 16, 18 are formed in the body 10, and a chamber 25 is formed between the plates 16, 18 for receiving a cylinder 30. An opening 17 is formed in the partition plate 16, and two apertures 19, 20 are formed in the other partition plate 18. A passage 21 is formed in the rear portion of the body 10 and is in alignment with the aperture 19. A pin 22 is slidably received in the passage 21 and has an enlarged head 23 formed on the rear end thereof. A container 24 is provided in the rear portion of the body 10 for containing hydraulic oil.

A piston 31 and a piston rod 32 are slidably received in the cylinder 30, in which the front end of the piston rod 32 extends outward beyond the cylinder 30 and extends through the opening 17 of the partition plate 16. A cutter 33 is fixed on the front end of the piston rod 32 by such as threaded engagement and is movable toward the fixed jaw 14. A spring 34 is provided around the piston rod 32 and is biased between the cylinder 30 and the piston 31 for biasing the piston 31 rearward so that the cutter 33 can be retracted to the position as shown in FIG. 2. Two screw holes 35 are formed in the rear end of the cylinder 30. A sleeve nut 36 is threadedly engaged in each of the screw holes 35. A spring 37 and a ball 38 are received in each of the sleeve nuts 36 and act as a check valve. A tube 39 is connected between the upper sleeve nuts 36 and the container 24. The ball 38 of the upper sleeve nut 36 is arranged such that it can be pushed inwards of the upper sleeve nut 36 by the pin 22.

A second cylinder 40 is disposed in the upper portion of the grip member 11 and is located below the container 24. A piston 41 is slidably received in the cylinder 40 and a piston rod 42 is fixed on the front end of the piston 41 and extends outward beyond the cylinder 40. A disc 43 is integrally formed on the front end of the piston rod 42. A spring 44 is biased between the disc 43 and the cylinder 40 so that the piston 41 is caused to move forward of the cylinder 40. The disc 43 contacts the upper portion of the handle 12 and arranged such that the piston 41 can be caused to move rearward by the handle 12. A check valve 45 is disposed between the container 24 and the cylinder 40 and is arranged such that the hydraulic oil contained within the container 24 can flow into the cylinder 40 and can not flow backward into the container 24. A conduit 46 is connected between the lower sleeve nuts 36 and the rear portion of the cylinder 40.

Figure 3:
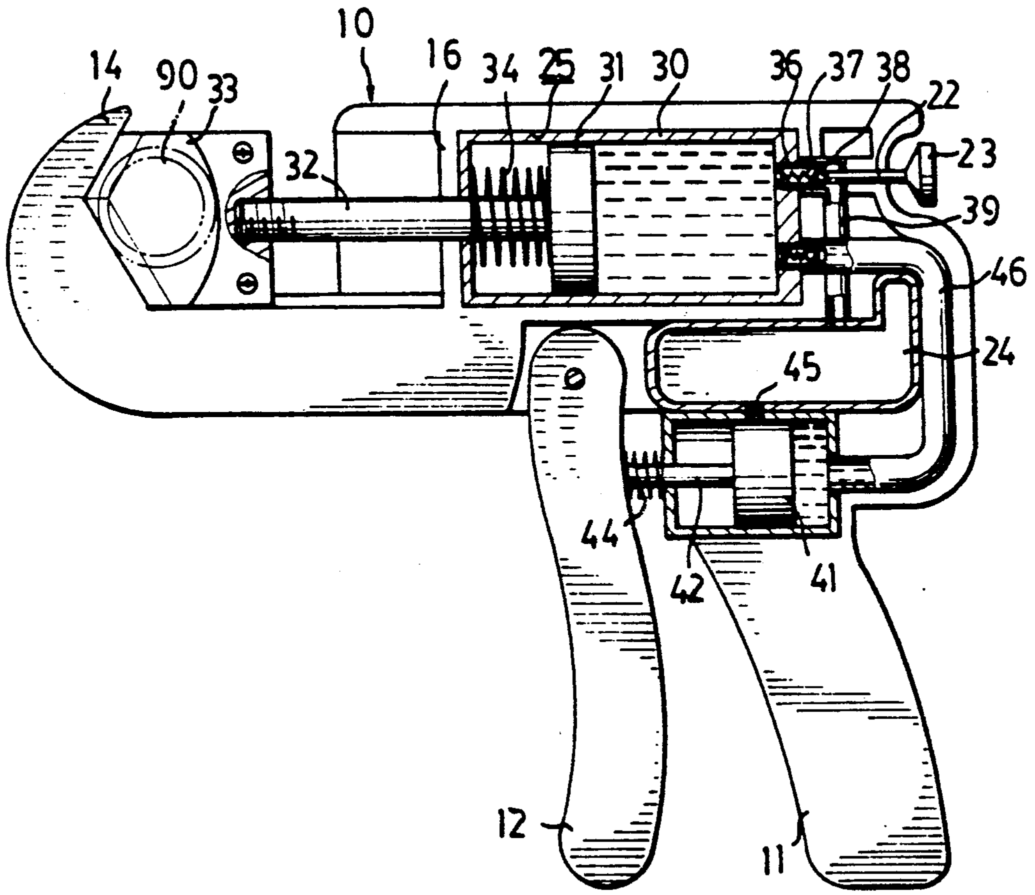
FIG. 3 is a partial cross sectional view similar to FIG. 2, illustrating an operation of the hydraulic type pipe cutter.

In operation, referring to FIGS. 2 and 3, the piston 41 of the cylinder 40 is biased forward to the position as shown in FIG. 2 by the spring 44. The check valve 45 allows the hydraulic oil contained within the container 24 to flow into the cylinder 40 when the piston 41 moves forwards. When the piston 41 is caused to move rearward by the handle 12, the oil contained in the cylinder 40 will be pressurized and is caused to flow into the cylinder 30 and is prevented from flowing backward into the cylinder 40 by the lower check valve 36. Repeat pulling the handle 12, the piston 31 of the first cylinder 30 and the cutter 33 can be pushed forward by the hydraulic oil so that the pipe 90 disposed in the mouth 13 can be cut by the cutter 33.

The ball 38 of the upper sleeve nut 36 can be pushed inwards by the pin 22 when the head 23 of the pin 22 is depressed. At this moment, the piston 31 is pushed rearward by the spring 34 so that the hydraulic oil contained within the cylinder 30 can be caused to flow into the container 24 via the tube 39.

Accordingly, the plastic pipes can be cut neatly and effectively by the hydraulic type pipe cutter in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe cutter comprising:

a body including a grip extended downward therefrom, a fixed jaw provided on a front end thereof, a mouth formed beside said fixed jaw for receiving a pipe to be cut, a handle pivotally coupled to said body and located in front of said grip;

a first cylinder disposed in an upper and rear portion of said body and including a first piston and a first piston rod slidably disposed therein, a front end of said first piston rod extending forward beyond said first cylinder, a first spring being provided for biasing said first piston rod and said first piston rearward to a retracted position;

a cutter fixed to said front end of said first piston rod and movable toward said fixed jaw;

a container disposed in said body for containing hydraulic oil and connected to said first cylinder so that hydraulic oil contained in said first cylinder may flow into said container; and a second cylinder disposed in an upper portion of said grip and including a second piston and a second piston rod slidably disposed therein, a front end of said second piston rod extending forward beyond said second cylinder, a second spring being provided for biasing said second piston and said second piston rod forward, a front end of said second piston rod contacting said handle so that said second piston and said second piston rod can be caused to move rearward by said handle, said second cylinder being connected to said first cylinder and being communicated with said container, said hydraulic oil flowing into said second cylinder when said second piston moves forward and being caused to flow into said first cylinder when said second piston is caused to move rearward by said handle; and said cutter can be caused to move forward toward said fixed jaw when said handle is repeatedly pulled so that said pipe can be cut by said cutter.

2. A pipe cutter according to claim 1, wherein two screw holes are formed in a rear end of said first cylinder, a sleeve nut is threadedly engaged in each of said screw holes and comprises a third spring and a ball disposed therein in order to form a check valve, a conduit connects a first sleeve nut to said second cylinder, said third spring and said ball disposed in said first sleeve nut prevents said hydraulic oil contained in said first cylinder from flowing back to said second cylinder, a tube connects a second sleeve nut to said container, said third spring and said ball disposed in said second sleeve nut prevents said hydraulic oil contained in said first cylinder from flowing back to said container, and a pin is disposed in said body and is aligned with said second sleeve nut and has a rear end extended rearward beyond said body, said ball disposed in said second sleeve nut can be pushed inwards of said second sleeve nut when said pin is depressed inwards of said body so that said hydraulic oil contained in said first cylinder can flow into said container.

3. A pipe cutter according to claim 2, wherein a passage is formed in said upper and rear portion of said body, said pin is slidably received in said passage, a head is formed in said rear end of said pin, a front end of said pin contacts said ball disposed in said second sleeve nut so that said ball disposed in said second sleeve nut can be pushed inwards of said second sleeve nut when said head of said pin is depressed inwards of said body.

4. A pipe cutter according to claim 2, wherein a pair of partition plates are formed in said upper and rear portion of said body so that a chamber is formed between said partition plates for receiving said first cylinder, an opening is formed in a first partition plate, said first piston rod extends through said opening and extends toward said front end of said body, two apertures are formed in a second partition plate for receiving said sleeve nuts.

5. A pipe cutter according to claim 1, wherein a check valve is disposed between said container and said second cylinder so that said hydraulic oil contained in said second cylinder is prevented from flowing back into said container.

6. A pipe cutter according to claim 1, wherein a disc is formed in said front end of said second piston rod and contacts an upper portion of said handle, said second spring is disposed on said second piston rod and is biased between said disc and said second cylinder so that said second piston rod can be biased forward by said second spring.

7. A pipe cutter according to claim 1, wherein said first spring is disposed in said first cylinder and is disposed on said first piston rod and is biased between said first cylinder and said first piston so that said first piston can be pushed rearward by said first spring.

* * * * *